US011510420B2

(12) United States Patent
Chanforan et al.

(10) Patent No.: US 11,510,420 B2
(45) Date of Patent: Nov. 29, 2022

(54) CARAMEL DERIVED COLOR WITH INCREASED BRIGHTNESS

(71) Applicant: Chr. Hansen Natural Colors A/S, Denmark (DK)

(72) Inventors: Céline Chanforan, Montpellier (FR); Carine Mané, Lauret (FR); Eric Jouenne, Teyran (FR)

(73) Assignee: CHR. HANSEN NATURAL COLORS A/S, Horsholm (DK)

( * ) Notice: Subject to any disclaimer, the term of this patent is extended or adjusted under 35 U.S.C. 154(b) by 982 days.

(21) Appl. No.: 15/774,812

(22) PCT Filed: Nov. 10, 2016

(86) PCT No.: PCT/EP2016/077219
§ 371 (c)(1),
(2) Date: May 9, 2018

(87) PCT Pub. No.: WO2017/081129
PCT Pub. Date: May 18, 2017

(65) Prior Publication Data
US 2020/0229459 A1     Jul. 23, 2020

(30) Foreign Application Priority Data
Nov. 10, 2015   (EP) .................................... 15193817
Sep. 27, 2016   (EP) .................................... 16190713

(51) Int. Cl.
*A23G 3/32*     (2006.01)
*A23L 5/42*     (2016.01)
*A23L 2/58*     (2006.01)

(52) U.S. Cl.
CPC .................. *A23G 3/32* (2013.01); *A23L 2/58* (2013.01); *A23L 5/42* (2016.08)

(58) Field of Classification Search
CPC ................ A23G 3/32; A23L 5/42; A23L 2/58
See application file for complete search history.

(56) References Cited

U.S. PATENT DOCUMENTS

| 3,249,444 A | 5/1966 | Bollenback et al. |
| 4,330,561 A | 5/1982 | Nemoto et al. |
| 5,114,492 A * | 5/1992 | Wolf ........................ A23G 3/32 127/42 |
| 2011/0244102 A1* | 10/2011 | Ramaswamy ............ A23L 2/58 426/540 |

FOREIGN PATENT DOCUMENTS

CN     101864190 A     10/2010

OTHER PUBLICATIONS

Al-Rawahy et al., Preparation of Caramel Colour from Dates, Food Processing Laboratory Agricultural Production Research Center, Proc. IIIrd IC on Date Palm, Acta Hort 736, ISHS 2007.*

* cited by examiner

*Primary Examiner* — Donald R Spamer
*Assistant Examiner* — Philip A Dubois
(74) *Attorney, Agent, or Firm* — Jerold I. Schneider; Schneider IP Law

(57) ABSTRACT

Use of a caramel colorant derived composition comprising the lower Molecular Weight (MW) solid particles of a caramel color product of Class I (E150a), Class II (E150b), Class III (E150c), Class IV (E150d) or a mixture of these Classes for coloring an edible product.

6 Claims, 7 Drawing Sheets

Same dosage in soft drink in term of EBC (measured at 430 nm)

CARAMEL DERIVED COLOR WITH INCREASED BRIGHTNESS

CROSS-REFERENCE TO RELATED APPLICATIONS

The present application is the U.S. National Stage of International Application PCT/EP2016/077219, filed Nov. 10, 2016, and claims priority to European Patent Application Nos. 15193817.2, filed Nov. 10, 2015, and 16190713.4, filed Sep. 27, 2016.

FIELD OF THE INVENTION

The present invention relates to use of a caramel colorant derived composition comprising the lower Molecular Weight (MW) solid particles of a caramel color product of Class I (E150a), Class II (E150b), Class III (E150c), Class IV (E150d) or a mixture of these Classes for coloring an edible product.

BACKGROUND

Colorants containing natural coloring substances separated from plant, animal or microbial materials are commonly used in the manufacturing of e.g. food products, feed products and pharmaceutical products.

A wide range of such food grade or pharmaceutically acceptable coloring agents is commercially available making it possible for the manufacturer, where a particular color tone is desired, to select a single coloring agent having the desired color or a mixture of coloring agents which in an appropriate combination impart the desired color to the product.

Any of the above types of available coloring agents can be hydrophilic or hydrophobic and, thus, the coloring substances may be water-soluble, sparingly soluble in water and aqueous media or essentially oil soluble.

The natural colorants should preferably be stable towards changes in temperature and light.

Yellow is a frequently desired color hue for food products, such as beverages, bakery products, prepared foods and confectionaries.

Currently available yellow natural colorants include natural pigments such as carotenoids and curcuminoids plus carthamus and gardenia.

Carotenoids and curcuminoids are water-insoluble natural pigments and therefore not as such (i.e. without relevant formulation work) useful in many beverages, such as e.g. soft drinks.

Carthamus and gardenia are natural water soluble pigments, but these pigments present drawbacks—for instance is gardenia is not stable to light in a beverage and carthamus presents a quite strong off-note.

Accordingly, there is a need in the art for new water soluble yellow/orange like natural colorant products that could be used in e.g. beverages.

Caramel colors are food additives useful for imparting a brown color shade to various edible products. They are manufactured by heat treatment of a solution of food grade nutritive carbohydrates consisting of glucose, fructose and/or polymers thereof with or without a catalyst in a process called caramelization.

As known in the art—caramel colors are classified in 4 classes (E-numbers) by the catalyst used to promote the caramelization reaction:

Class I (E150a; caramel A): Plain caramel, caustic caramel, burnt sugar. Prepared by heating carbohydrates with or without acids or alkalis; no ammonium or sulphite compounds are used.

Class II (E150b; caramel B): Caustic sulphite caramel. Prepared by heating carbohydrates with or without acids or alkalis in the presence of sulfite compounds; no ammonium compounds are used.

Class III (E150c; caramel C): Ammonia caramel. Prepared by heating carbohydrates with or without acids or alkalis in the presence of ammonium compounds; no sulfite compounds are used.

Class IV (E150d; caramel D): Sulphite ammonia caramel. Prepared by heating carbohydrates with or without acids or alkalis in the presence of both sulfite and ammonium compounds.

As known in the art—E-numbers are codes for substances that can be used as food additives for use within the European Union and the E-numbers are not changed over time and E-numbers therefore directly and unambiguously technically defined a food additive of interest.

Ultrafiltration is a process to separate materials of relatively high molecular weight from those of lower molecular weight. The process typically encompasses placement of a solvent (e.g., water) solution containing the materials to be separated on one side (retentate side) of a semi-permeable membrane. The size of the membrane is selected so as to retain materials in the solution above a particular molecular weight but to allow the passage, with solvent, of those below a particular molecular weight (permeate). Hydrostatic or hydrokinetic pressure is applied to the solution, and continuous or periodic addition of solvent to the solution allows the ultrafiltration to continue for a time sufficient to reach a theoretically high degree of relevant separation of the compounds sample according to relevant Molecular Weight (MW).

The ultrafiltration utilizes semi-permeable membranes which are defined by "molecular weight cut off" or MWCO. MWCO is the mass ratio of a molecule in reference to the hydrogen atom that is filtered out by the membrane.

Processes for separating caramel color bodies in caramelized carbohydrate solutions using membrane separation techniques by ultrafiltration techniques have been developed and extensively used in order to increase the coloring power of caramel colors (U.S. Pat. Nos. 3,249,444, 4,416,700, 5,114,492).

The described processes involve collecting the retentates containing the high molecular weight coloring bodies and discarding the remaining liquid of low molecular weight solids (i.e. the permeate).

US 2011/0244102, directed to a method for removal of reaction byproducts and impurities from caramel color, discloses the use of a semi-permeable membrane having a MWCO of 3000 Daltons or less to yield a retentate comprising most of the higher MW solids of the caramel color.

In short, in relation to caramel color the prior art describes ultrafiltration processes that involve collecting the retentates containing the high molecular weight coloring bodies and discarding the remaining liquid of low molecular weight solids (permeate).

For instance, U.S. Pat. No. 5,114,492 describes use of a membrane with MWCO of 10,000 Daltons and the collected caramel color retentate is termed the color fraction and the discharged unwanted permeate is simply termed "non-color fraction"—i.e. U.S. Pat. No. 5,114,492 essentially teaches that caramel color compounds/bodies with a MW below 10,000 Daltons (Da) are not useful to make a commercial relevant color product.

Accordingly, the prior art does not describe a process for making a caramel color derived product, wherein focus has been on isolation/collecting the permeate (i.e. low MW solids) during an ultrafiltration based process.

SUMMARY OF THE INVENTION

The problem to be solved by the present invention relates to the provision of a novel water soluble natural colorant which has a high brightness and may have a yellow/orange like color appearance. Such a colorant may be useful for coloring a variety of edible products, such as in particular beverages (e.g. soft drinks).

The present invention may be seen as being based on that the present inventors identified that a permeate (i.e. low MW solids/compounds) obtained from membrane ultrafiltration of a prior art caramel color product was actually very useful as a color composition for coloring e.g. an edible product/ such as e.g. soft drinks.

As discussed above, the prior art (se discussion above) essentially teaches away from using the caramel color low MW compounds (i.e. the permeate).

As discussed above—for instance U.S. Pat. No. 5,114,492 essentially teaches that caramel color compounds/bodies with a MW below 10,000 Daltons (Da) are not useful to make a commercial relevant color product.

As discussed in working examples and illustrated in figures herein—in different experiments the present inventors used semi-permeable membranes having a MW cut-off of 10000 Da and 5000 Da and in both cases the obtained permeate (i.e. low MW compounds) gave a caramel colorant derived low MW compounds composition with significant increased/improved brightness as compared to the prior art caramel color product (i.e. before the ultrafiltration) as such.

As known in the art (see discussion below)—in the known L* C* h* color space, the chroma (C*) value relates to brightness appearance of the color, wherein increased C* value relates to increased brightness.

As discussed in working examples herein—a caramel colorant derived low MW compounds composition as described herein (i.e. permeate) had significantly higher C* value (i.e. increased brightness) as compared to the prior art caramel color product (i.e. before the ultrafiltration) as such.

Further, the herein described novel caramel colorant derived low MW compounds composition (i.e. permeate) may have a more yellow/orange like hue appearance as compared to the more brown color shade/hue of the prior art caramel color product (i.e. before the ultrafiltration)—see e.g. figures herein.

Without being limited to theory—it is believed that if one uses a semi-permeable membrane having a MW cut-off below 12500 Da then it would be possible to obtain a caramel colorant derived low MW compounds composition as described herein (i.e. permeate) with increased/improved brightness.

Accordingly, a first aspect of the present invention relates to use of a caramel colorant derived composition comprising the lower Molecular Weight (MW) solid particles of a caramel color product of Class I (E150a), Class II (E150b), Class III (E150c), Class IV (E150d) or a mixture of these Classes for coloring an edible product; and wherein caramel colorant derived composition is characterized by that at least 98 wt % of the caramel color solid particles of the caramel colorant derived composition are solid particles with a MW below 12500 Da and wherein the solid particles are derived from a caramel color product of Class I (E150a), Class II (E150b), Class III (E150c), Class IV (E150d) or a mixture of these Classes.

As known to the skilled person in relation to ultrafiltration, a relatively low amount of solid particles slightly bigger than the membrane MW cut-off, may be present in the permeate after ultrafiltration.

It is routine work for the skilled person to determine MW of caramel color solid particles in a caramel colorant derived composition as described herein.

Accordingly, it is routine work for the skilled person to determine if the requirement of the first aspect is fulfilled for a caramel colorant composition of interest—i.e. for a caramel colorant derived composition of interest it is routine work for the skilled person to determine if at least 98 wt % of the caramel color solid particles of the caramel colorant derived composition are solid particles with a MW below 12500 Da and wherein the solid particles are derived from a caramel color product of Class I (E150a), Class II (E150b), Class III (E150c), Class IV (E150d) or a mixture of these Classes.

As discussed above—the terms Class I (E150a), Class II (E150b), Class III (E150c) and Class IV (E150d) are well known terms in relation to caramel color products—i.e. the skilled person can routinely determine if a caramel color product is e.g. a Class II (E150b) caramel color product or if it belongs to one of the other different Classes.

A second aspect of the present invention relates to the use of a caramel colorant derived composition comprising the lower Molecular Weight (MW) solid particles of a caramel color product of Class I (E150a), Class II (E150b), Class III (E150c), Class IV (E150d) or a mixture of these Classes for coloring an edible product; and
  wherein the colorant derived composition is characterized
    by that it is a colorant derived composition obtainable by a method for preparing a caramel colorant derived composition comprising the following steps:
    (a): subjecting a solution of a caramel color product of Class I (E150a), Class II (E150b), Class III (E150c), Class IV (E150d) or a mixture of these Classes to ultrafiltration through a semi-permeable membrane having a MW cut-off of at the most 12500 Daltons (Da); and
    b) collecting the permeate to obtain the colorant derived composition.

The ultrafiltration based method of the second aspect should be understood as the skilled person would understand it in the present context.

As understood by the skilled person in the present context—if there e.g. is used a semi-permeable membrane having a MW cut-off of 10000 Daltons (Da) then the vast majority of the solid particles in the permeate will have a MW below 10000 Da and relatively very few particles will be slightly bigger (e.g. few particles may have a MW around 10500 Da.).

As understood by the skilled person in the present context—the retentate of an ultrafiltration method of the second aspect may be seen to correspond to a prior art described caramel color product (see e.g. U.S. Pat. No. 5,114,492 discussed above).

Accordingly, the retentate may be used as a standard prior art caramel color product, which is an advantage since it may give optimal utilization of the starting caramel material resulting in a higher cost-efficiency and less disposal of waste.

Embodiment of the present invention is described below, by way of examples only.

DRAWINGS

DETAILED DESCRIPTION OF THE INVENTION

Figure 1:
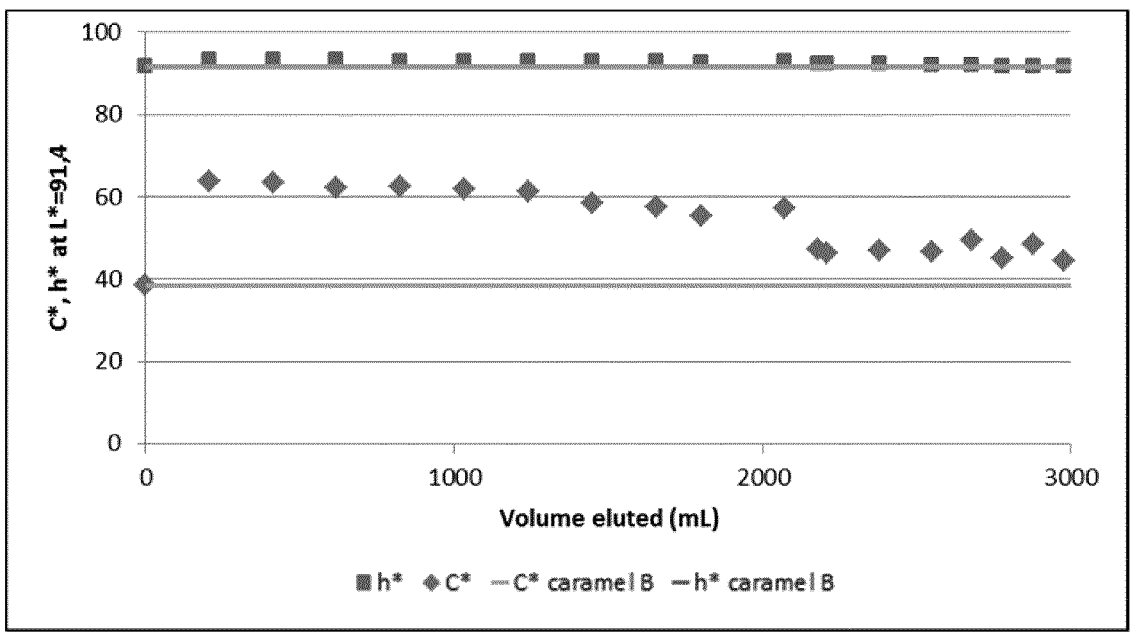
FIG. 1 shows the evolution of permeate shade (h*) and chroma (C*) at L*=91.4 in distilled water during the ultra-filtration on 10 kD of the caramel B. C* and h* values associated to the initial caramel E150b are also represented.

Properties of Color and CIE Color Spaces in General

As known in the art—the properties of color which are inherently distinguishable by the human eye are hue, saturation, and brightness. While we know that the spectral colors can be one-to-one correlated with light wavelength, the perception of light with multiple wavelengths is more complicated. It is found that many different combinations of light wavelengths can produce the same perception of color. This can be put in perspective with a so-called CIE chromaticity diagram.

The term "hue" is one of the main properties of a color, defined technically (in the CIECAM02 model), as "the degree to which a stimulus can be described as similar to or different from stimuli that are described as red, green, blue, and yellow" (the unique hues). Orange and violet (purple) are the other hues, for a total of six, as in the rainbow: red, orange, yellow, green, blue, violet.

Hue is related to wavelength for spectral colors. It may be convenient to arrange the saturated hues around a Newton Color Circle. Starting from red and proceeding clockwise around the Newton Color Circle to blue proceeds from long to shorter wavelengths. Not all hues can be represented by spectral colors since there is no single wavelength of light which has e.g. the magenta hue—it may be produced by an equal mixture of red and blue.

According to the art—the term "hue" may alternatively be referred to as e.g. tint or shade.

The term "Saturation" may be seen as relating to the amount of white in a color. Pink may be thought of as having the same hue as red but being less saturated. A fully saturated color is one with no mixture of white. A spectral color consisting of only one wavelength is fully saturated, but one can have a fully saturated magenta which is not a spectral color. Quantifying the perception of saturation must take into account the fact that some spectral colors are perceived to be more saturated than others. For example, monochromatic reds and violets are perceived to be more saturated than monochromatic yellows. There are also more perceptibly different levels of saturation for some hues—a fact accounted for in the so-called Munsell color system.

One of the features of a so-called Color Wheel is to help visualize the effect of adding white paint or pigment, where addition of a white pigment or paint makes the color less saturated.

The term "brightness" of a colored surface depends upon the illuminance and upon its reflectivity. Accordingly, white has a higher brightness value than black. Since the perceived brightness is not linearly proportional to the reflectivity, a scale from 0 to 10 is used to represent perceived brightness in color measurement systems like the Munsell system. Brightness is an attribute of visual perception in which a source appears to be radiating or reflecting light. In other words, brightness is the perception elicited by the luminance of a visual target. This is a subjective attribute/property of an object being observed and one of the color appearance parameters of color appearance models.

In colorimetry and color theory is also used the term "lightness" (also known as value or tone), which is a representation of variation in the perception of a color or color space's brightness. It is one of the color appearance parameters of any color appearance model. Lightness is a relative term. Lightness means brightness of an area judged relative to the brightness of a similarly illuminated area that appears to be white or highly transmitting. Lightness should not be confused with brightness.

The term "CIE" is short for 'Commission Internationale de l'Eclairage', which in English is the 'International Commission on Illumination'. It is a professional scientific organization founded some 90 years ago to exchange information on 'all matters relating to the science and art of lighting'. The standards for color spaces representing the visible spectrum were established in 1931, but have been revised more recently.

CIE has over the time defined different suitable parameters to characterize a color of interest (termed so-called "color space").

At the filing date of the present application—the CIE homepage was: http://www.cie.co.at There are different CIE color spaces (alternatively termed models), which serve different purposes.

CIE L*a*b* (CIELAB or CIELab) is a color space that describes all the colors visible to the human eye and was created to serve as a device-independent model to be used as a reference.

The three coordinates of CIELAB represent the lightness of the color (L*=0 yields black and L*=100 indicates diffuse white; specular white may be higher), its position between red/magenta and green (a*, negative values indicate green while positive values indicate magenta) and its position between yellow and blue (b*, negative values indicate blue and positive values indicate yellow). Since the L*a*b* model is a three-dimensional model, it can be represented properly only in a three-dimensional space.

Two-dimensional depictions include chromaticity diagrams: sections of the color solid with a fixed lightness.

The public available ISO standard with reference "BS EN ISO 11664-4:2011" (ISBN 978 0 580 72262 2) describes the CIE L*a*b* color space and the CIE L* C* h* color space in details.

The ISO standard with reference "BS EN ISO 11664-4:2011" is the UK implementation of EN ISO 11664-4:2011.

The CIE L* C* h* color space (alternatively termed CIELCh or CIELCH) is a CIELab cube color space, whereby instead of Cartesian coordinates a*, b*, the cylindrical coordinates C* (chroma, relative saturation) and h* (hue angle, angle of the hue in the CIELab color wheel) are specified. The CIELab L* remains unchanged.

The conversion of a* and b* in C* and h* (alternatively termed h°) is done using the following formulas (see above referred ISO standard with reference "BS EN ISO 11664-4:2011"):

$$C_{ab}^* = [(a^*)^2 + (b^*)^2]^{1/2}$$
$$h_{ab} = \arctan(b^*/a^*)$$

Consequently, if one knows the L*a*b* color space values one may by the formulas above mathematically calculate the corresponding L* C* h* color space values.

Accordingly, it is routine work for the skilled person to determine CIE L*a*b* color space and CIE L* C* h* color space values.

Use of a caramel colorant derived composition for coloring a product

As discussed above, a first aspect of the invention relates to use of a caramel colorant derived composition comprising the lower Molecular Weight (MW) solid particles of a caramel color product of Class I (E150a), Class II (E150b), Class III (E150c), Class IV (E150d) or a mixture of these Classes for coloring an edible product; and wherein caramel colorant derived composition is characterized by that at least 98 wt % of the caramel color solid particles of the caramel colorant derived composition are solid particles with a MW below 12500 Da and wherein the solid particles are derived from a caramel color product of Class I (E150a), Class II (E150b), Class III (E150c), Class IV (E150d) or a mixture of these Classes.

According to the art—the term "wt %" relates to weight percentage.

Preferably, the caramel colorant derived composition is characterized by that at least 98 wt % of the caramel color solid particles of the caramel colorant derived composition are solid particles with a MW below 10500 Da and wherein the solid particles are derived from a caramel color product of Class I (E150a), Class II (E150b), Class III (E150c), Class IV (E150d) or a mixture of these Classes.

As discussed above, a second aspect of the invention relates to use of a caramel colorant derived composition comprising the lower Molecular Weight (MW) solid particles of a caramel color product of Class I (E150a), Class II (E150b), Class III (E150c), Class IV (E150d) or a mixture of these Classes for coloring an edible product; and
  wherein the colorant derived composition is characterized by that it is a colorant derived composition obtainable by a method for preparing a caramel colorant derived composition comprising following steps:
    (a): subjecting a solution of a caramel color product of Class I (E150a), Class II (E150b), Class III (E150c), Class IV (E150d) or a mixture of these Classes to ultrafiltration through a semi-permeable membrane having a MW cut-off of at the most 12500 Daltons (Da); and
    b) collecting the permeate to obtain the colorant derived composition.

As known to the skilled person in relation to ultrafiltration, a relatively low amount of solid particles slightly bigger than the membrane MW cut-off, may be present in the permeate after the ultrafiltration step.

The ultrafiltration based method of the second aspect should be understood as the skilled person would understand it in the present context.

As understood by the skilled person in the present context—if there e.g. is used a semi-permeable membrane having a MW cut-off of 10000 Daltons (Da) then the vast majority of the solid particles in the permeate will have a MW below 10000 Da and relatively very few particles will be slightly bigger (e.g. few particles may have a MW around 10500 Da.)

It may be preferred that the term "obtainable" in the second aspect is "obtained"—i.e. wherein the colorant derived composition is characterized by that it is a colorant derived composition obtained by a method for preparing a caramel colorant derived composition comprising following steps:
  (a): subjecting a solution of a caramel color product of Class I (E150a), Class II (E150b), Class III (E150c), Class IV (E150d) or a mixture of these Classes to ultrafiltration through a semi-permeable membrane having a MW cut-off of at the most 12500 Daltons (Da); and
  b) collecting the permeate to obtain the colorant derived composition.

In relation to the second aspect of the invention—it is preferred that the caramel colorant derived composition is characterized by that at least 98 wt % of the caramel color solid particles of the caramel colorant derived composition are solid particles with a MW below 12500 Da (preferably below 10500 Da) and wherein the solid particles are derived from a caramel color product of Class I (E150a), Class II (E150b), Class III (E150c), Class IV (E150d) or a mixture of these Classes.

It may be preferred that the semi-permeable membrane is having a MW cut-off of from 10500 Da to 950 Da (such as e.g. from 10500 Da to 4500 Da).

In working examples herein was used a semi-permeable membrane having a MW cut-off of 10000 Da and it is believed to be a most preferred MW cut-off.

For instance, some experiments made by the present inventors indicate that a 10000 Da membrane is preferred over e.g. a 5000 Da membrane for larger scale (e.g. pilot scale) production of herein discussed caramel colorant derived composition.

Accordingly, in a preferred embodiment the semi-permeable membrane is a semi-permeable membrane having a MW cut-off of from 10500 Da to 9500 Da.

The ultrafiltration should generally be performed according to standard procedures known in the art.

The ultrafiltration may be performed with a transmembrane pressure of between 0.5 to 2.5 bar (such as e.g. around 1.5 bar).

The ultrafiltration may be carried out at a temperature of between 10 and 40° C.

The term "° Brix" is the most commonly used refractometer scale for measuring solids dissolved in water and the skilled person will readily know how to measure ° Brix with a refractometer. One ° Brix equals 1 gram of sucrose per 100 mL of water.

It may be preferred that the method of the second aspect and embodiments thereof further comprises following step:
(c) concentrating the permeate of step (b) to a ° Brix of at least 50.

It may be preferred that the method of the second aspect and embodiments thereof further comprising drying the permeate.

It may be preferred that the colorant derived composition has a ° Brix of at least 50.

As discussed in working examples herein—very good improvements in relation to e.g. increased brightness were identified for the Class of the caramel color product of Class I (E150a) and Class II (E150b).

Accordingly, a preferred embodiment is wherein the Class of the caramel color product is Class I (E150a), Class II (E150b) or a mixture of these Classes.

The caramel colorant derived composition may e.g. be a liquid composition or a dried composition.

As discussed above, the public available ISO standard with reference "BS EN ISO 11664-4:2011" (ISBN 978 0 580 72262 2) describes the CIE L*a*b* color space and the CIE L* C* h* color space in details.

Accordingly, it is routine work for the skilled person to determine CIE L*a*b* color space and CIE L* C* h* color space values.

In working examples herein were used the standard well known commercially available spectrophotometer Datacolor 650® (commercial available at the company Datacolor (www.datacolor.com) for determination of CIE L* C* h* color space values.

As known in the art—the chroma (C*) value relates to brightness appearance of the color, wherein increased C* value relates to increased brightness.

As discussed in working examples herein—a caramel colorant derived low MW compounds composition as described herein (i.e. permeate) had significantly higher C* value (i.e. increased brightness) as compared to the prior art caramel color product (i.e. before the ultrafiltration) as such.

Accordingly, in a preferred embodiment the colorant derived composition in the L* C* h* color space, measured at an L* value of 70.0 in deionized water in a 1 cm-length quartz cell using spectrophotometer Datacolor 650® in transmission mode under D65 illuminant 10 degree observer and with wavelength range 360 nm to 700 nm and reporting at 10 nm intervals and transmission sampling aperture size of 22 mm; has C* and h* values within the following ranges:
C* value from 100.0 to 130.0
h* value from 65.0-77.0.

The spectrophotometer Datacolor 650® parameters indicated above may be seen as standard setting in the present context (e.g. in relation to above discussed ISO standards)—accordingly, it is routine work for the skilled person to determine herein relevant L* C* h* color space values by use of the well-known commercially able spectrophotometer Datacolor 650® apparatus.

As discussed in working examples herein—the caramel color products (i.e. before the ultrafiltration) used in the working examples herein had (at L* value of 70.0) the C* and h* values within the following ranges:
C* value from 80.09 to 91.73
h* value from 76.15-80.59.

Accordingly, the C* values (relating to brightness) of the caramel color products (i.e. before the ultrafiltration) were significantly lower than for a herein caramel colorant derived composition (e.g. permeate).

As known in the art—the L* value may be seen as relating to concentration of a color product of interest. Accordingly, a color product/composition may be diluted to get a higher L* value or up-concentrated to get a lower L* value.

Accordingly, for a color product/composition of interest that has a certain L* value (e.g. a L* value different form 70) it is routine work for the skilled person to dilute or up-concentrate the color product in order for the color product to get a L* value of 70.0 and thereby be able to analyze if the color product/composition of interest would have above required C* and h* values when the L* value is 70.0.

Said in other words and as understood by the skilled person in the present context—in order to determine if a color product/composition of interest has the herein relevant L* C* h* color space values one first adjust the L* value of the color product/composition of interest to L* value of 70.0 and then determine the above required C* and h* values and if the color product/composition of interest has the required C* and h* values, then it is understood to be a color product/composition of interest which corresponds to a colorant derived composition as described herein.

The skilled person understands that a colorant derived composition as described herein that has the required CIE L* C* h* color space values discussed herein would be understood to be a color that may have a yellow/orange hue appearance or may be give a yellow/orange hue color appearance to an edible product.

The present inventors identified that use of a lower concentration of a colorant derived composition as described herein for coloring e.g. a beverage may give a more pronounced yellow color to the beverage as compared to use of higher concentration of a colorant derived composition as described herein (which may give a more orange/brownish color color).

Examples of edible products include but are not limited to food products, feed products and pharmaceuticals.

Preferably the edible product is a food product.

Preferably, the food product is a beverage, a bakery product, a prepared food or a confectionary.

The term "prepared food" as used herein refers to food products prepared and cooked for sale and presented either freshly prepared or canned, frozen, dried or freeze-dried so as to be ready to serve or use with little or no further preparation.

In a preferred embodiment of the present invention the prepared food is selected from the group consisting of cereals, snacks, dry and frozen meals, soups, dressings, dips, sauces, condiments, and seasonings.

The term "bakery product" as used herein refers to food products prepared by cooking by dry heating usually from flour or meal derived from some form of grain.

Examples of bakery products include but are not limited to breads, rolls, buns, biscuits, bagels, croissants, doughnuts, cakes, cookies, crackers, meringues, pies, pastries and muffins.

In a preferred embodiment, the bakery product is selected from the group consisting of meringues and muffins.

In a more preferred embodiment, the edible product is a beverage (such as preferably a soft drink).

As can be seen in e.g. figures herein—different beverages colored with a caramel colorant derived composition as described herein (e.g. permeate) show a significant increased brightness.

The skilled person may routinely determine a how much of a caramel colorant derived composition as described herein that preferably should be added to the edible product in order to get a wanted color appearance of the edible product.

It may be preferred that there is added from 0.0001% (w/w) to 5% (w/w) (preferably from 0.001% (w/w) to 3% (w/w) and more preferably from 0.01% (w/w) to 2% (w/w)) of a caramel colorant derived composition as described herein to the edible product.

As understood by the skilled person—the % (w/w) relates to total weight of caramel colorant derived composition and total weight of the edible product.

Accordingly, if e.g. 1 g of caramel colorant derived composition is added to 1 L of a beverage (e.g. soft drink—assuming that the weight of 1 L beverage is roundly 1 kg)—then there is added 0.1% (w/w) of a caramel colorant derived composition as described herein to the edible product.

As understood by the skilled person in the present context—if one obtains a caramel colorant derived composition as described herein (e.g. as a permeate after ultrafiltration) and then blend it with a different color (e.g. a not caramel color that could be a natural color or a not natural color) before addition to the edible product then it would of course be understood to be a use of a caramel colorant derived composition as described herein for coloring an edible product as described herein.

The following items are preferred embodiments of the present invention:

Item 1. Use of a caramel colorant derived composition comprising the lower Molecular Weight (MW) solid particles of a caramel color product of Class I (E150a), Class II (E150b), Class III (E150c), Class IV (E150d) or a mixture of these Classes for coloring an edible product; and
wherein caramel colorant derived composition is characterized by that at least 98 wt % of the caramel color solid particles of the caramel colorant derived composition are solid particles with a MW below 12500 Daltons (Da) and wherein the solid particles are derived from a caramel color product of Class I (E150a), Class II (E150b), Class III (E150c), Class IV (E150d) or a mixture of these Classes.

Item 2. Use of a caramel colorant derived composition comprising the lower Molecular Weight (MW) solid particles of a caramel color product of Class I (E150a), Class II (E150b), Class III (E150c), Class IV (E150d) or a mixture of these Classes for coloring an edible product; and
wherein the caramel colorant derived composition is characterized by that it is a colorant derived composition obtainable by a method for preparing a caramel colorant derived composition comprising following steps:

(a): subjecting a solution of a caramel color product of Class I (E150a), Class II (E150b), Class III (E150c), Class IV (E150d) or a mixture of these Classes to ultrafiltration through a semi-permeable membrane having a MW cut-off of at the most 12500 Daltons (Da); and b) collecting the permeate to obtain the colorant derived composition.

Item 3. The use of item 2, wherein the term "obtainable" is "obtained" and wherein the colorant derived composition is characterized by that it is a colorant derived composition obtained by a method for preparing a caramel colorant derived composition comprising following steps:

(a): subjecting a solution of a caramel color product of Class I (E150a), Class II (E150b), Class III (E150c), Class IV (E150d) or a mixture of these Classes to ultrafiltration through a semi-permeable membrane having a MW cut-off of at the most 12500 Daltons (Da); and b) collecting the permeate to obtain the colorant derived composition.

Item 4. The use of any of items 2 or 3, wherein caramel colorant derived composition is characterized by that at least 98 wt % of the caramel color solid particles of the caramel colorant derived composition are solid particles with a MW below 12500 Da and wherein the solid particles are derived from a caramel color product of Class I (E150a), Class II (E150b), Class III (E150c), Class IV (E150d) or a mixture of these Classes.

Item 5. The use of any of items 2 to 4, wherein semi-permeable membrane is having a MW cut-off of from 10500 Da to 950 Da.

Item 6. The use of item 5, wherein semi-permeable membrane is having a MW cut-off of from 10500 Da to 4500 Da.

Item 7. The use of item 6, wherein semi-permeable membrane is having a MW cut-off of from 10500 Da to 9500 Da.

Item 8. The use of any of items 2 to 7, wherein ultrafiltration is performed with a transmembrane pressure of between 0.5 to 2.5 bar and wherein the ultrafiltration is carried out at a temperature of between 10 and 40° C.

Item 9. The use of any of items 2 to 8, wherein the method of any of items 2 or 3 further comprises following step:
(c) concentrating the permeate of step (b) to a ° Brix of at least 50.

Item 10. The use of any of items 2 to 9, wherein the method further comprising drying the permeate.

Item 11. The use of any of the preceding items, wherein colorant derived composition has a ° Brix of at least 50.

Item 12. The use of any of the preceding items, wherein the Class of the caramel color product is Class I (E150a), Class II (E150b) or a mixture of these Classes.

Item 13. The use of any of the preceding items, wherein colorant derived composition in the L* C* h* color space, measured at an L* value of 70.0 in deionized water in a 1 cm-length quartz cell using spectrophotometer Datacolor 650® in transmission mode under D65 illuminant 10 degree observer and with wavelength range 360 nm to 700 nm and reporting at 10 nm intervals and transmission sampling aperture size of 22 mm; has C* and h* values within the following ranges:
C* value from 100.0 to 130.0
h* value from 65.0-77.0

Item 14. The use of any of the preceding items, wherein caramel colorant derived composition is used for coloring a food product.

Item 15. The use of item 14, wherein the food product is a beverage, a bakery product, a prepared food or a confectionary.

Item 16. The use of item 15, wherein the food product is a beverage.

Item 17. The use of item 16, wherein the beverage is a soft drink.

Item 18. The use of any of the preceding items, wherein there is added from 0.001% (w/w) to 3% (w/w) of the caramel colorant derived composition to the edible product.

Item 19. The use of item 18, wherein the edible product is a beverage.

EXAMPLES

Example 1. Process for Obtaining a Bright Yellow Caramel and a Bright Yellow Burnt Sugar at Laboratory Scale (Before Further Concentration)

Description of the Process

The starting materials were caramel A (E150a) here burnt sugar and caramel B (E150b). About 200 g of starting material was diluted ten times in deionized water and then ultrafiltrated through a 10000 D cut-off membrane. The transmembrane pressure remained below 1.5 bar during the process.

Supplementary additions of deionized water were performed during the ultrafiltration, each time the remaining retentate volume was estimated between 100 and 200 mL: 400 mL were added at the first supplementation, and 200 mL thereafter. After ultrafiltration, the first 2000 mL of permeate were gathered and evaluated in term of shade. The retentate was recovered and evaluated as well.

The UF membrane used for the process consisted of polyethersulfone material; the active membrane area was equal to 200 cm$^2$.

Evaluation of the Tint and the Brightness Evolution During the Process

The monitoring of permeate shade was performed using a 1 cm-length quartz cell and a spectraflash 650 (Datacolor) in transmission mode under D65/10 degree illuminant.

Samples, taken on line, were diluted in deionized water in order to obtain a lightness value around 91.4, and 70.0-70.1 for the caramel, the permeate or the retentate.

When spectrophotometer Datacolor 650® was used and if not said otherwise in the Examples herein—the L* C* h* color space was measured at a given L* value (e.g. a L* value of 70.0) in deionized water in a 1 cm-length quartz cell using spectrophotometer Datacolor 650® in transmission mode under D65 illuminant 10 degree observer and with wavelength range 360 nm to 700 nm and reporting at 10 nm intervals and transmission sampling aperture size of 22 mm.

Results and Discussion

Evolution of the Shade and Brightness During the Ultrafiltration Step

FIG. 1 shows the evolution of permeate shade (h*) and chroma (C*) during the filtration of the caramel B.

Figure 2:
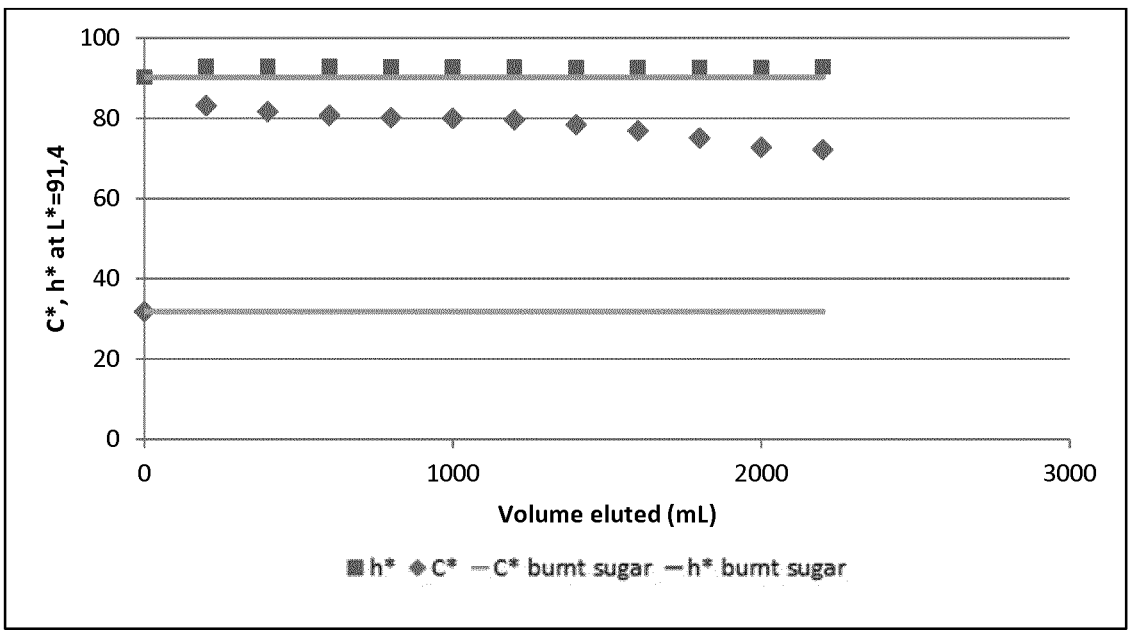
FIG. 2 depicts the evolution of permeate shade (h*) and chroma (C*) at L*=91.4 in distilled water during the ultra-filtration on 10 kD of the burnt sugar. C* and h* values associated to the initial burnt sugar are also represented.

FIG. 2 shows the evolution of permeate shade (h*) and chroma (C*) during the filtration of the caramel A.

Ultrafiltration does not modify the shade of the caramel B or of the caramel A; the hue remains the same whatever the elution volume.

According to the C* values, the ultrafiltration allows for a large increase of the brightness for both products tested (particularly visible at the beginning of the filtration process). The improvement of the brightness is more significant for the burnt sugar than for the caramel B (C* increased by 52 units for burnt sugar and 25 units for caramel B).

The C* values decrease during the ultrafiltration process, however, remain largely higher than the C* values of the initial products.

Color Characteristics of Permeate and Retentate

TABLE 1

Colorimetric characteristics of caramel B, bright yellow permeate and retentate of the ultrafiltration of caramel B.

|  | L | a | b | C* | h* |
|---|---|---|---|---|---|
| Caramel B | 70.10 | 19.59 | 84.22 | 86.47 | 76.91 |
| Permeate - bright yellow caramel | 70.00 | 28.15 | 103.96 | 107.7 | 74.85 |
| Retentate | 70.00 | 20.48 | 82.60 | 85.10 | 76.08 |

The bright yellow caramel permeate presents a tint (h*) close to the initial caramel B, but is much brighter.

The retentate presents colorimetric characteristics similar to those of the caramel B.

TABLE 2

Colorimetric characteristics of burnt sugar, bright yellow burnt sugar and retentate of the ultrafiltration of caramel A.

|  | L | a | b | C* | h* |
|---|---|---|---|---|---|
| Caramel A (burnt sugar) | 70.00 | 18.94 | 77.82 | 80.09 | 76.32 |
| Permeate - bright yellow burnt sugar | 70.06 | 35.41 | 112.84 | 118.27 | 72.58 |
| Retentate | 70.01 | 18.37 | 75.95 | 78.14 | 76.4 |

The bright yellow burnt sugar permeate presents a tint slightly more orange than the initial burnt sugar, and is much brighter.

The retentate presents colorimetric characteristics similar to those of the initial burnt sugar.

Example 2. Process for Obtaining a Bright Yellow Caramel at Pilot Scale

Description of the Process

The starting product was a caramel B (E150b). 40 kg of starting product was diluted twenty times in tap-water, and then ultrafiltrated through a 10,000 Da cut-off membrane.

The ultrafiltration apparatus was equipped with polyethersulfone membranes (two modules in parallel, each containing two membranes in series). Each membrane consisted of a 16.7 m$^2$ active area.

Ultrafiltration parameters were set as follows:
Temperature: 19.6° C.
Initial permeate flow: 347 L/h
Inlet pressure: 0.4 bar
Outlet pressure: 0 bar
Delta trans=0.2 bar After filtration, the permeate was concentrated until reaching a ° Brix close to 75. The product was characterized in terms of shade and color strength.

Analytical Methods

Evaluation of the Tint and the Brightness Evolution During the Process

The monitoring of permeate shade was performed using the colorimeter Minolta CT 310.

Samples were diluted in deionized water in order to obtain a lightness value around 91.4.

The shade of the caramel B, the bright yellow caramel (permeate) and the retentate were measured using a 1 cm-length quartz cell and a spectraflash 650 (Datacolor) in transmission mode under D65/10 degree illuminant. Samples were diluted in deionized water in order to obtain a lightness value equal to 70.0-70.1.

Evaluation of Color Strength

Around 0.1 g of sample was diluted in a 100 mL-flask with deionized milliQ-water. The absorbance was read at 430 nm, and the color strength was calculated as following:

EBC units=Abs(430 nm)*$D$*100

D is the dilution coefficient and is expressed in mL/g (flask volume/sample weight)

Results and Discussion

Evolution of the Shade and Brightness During the Ultrafiltration Step

Figure 3:
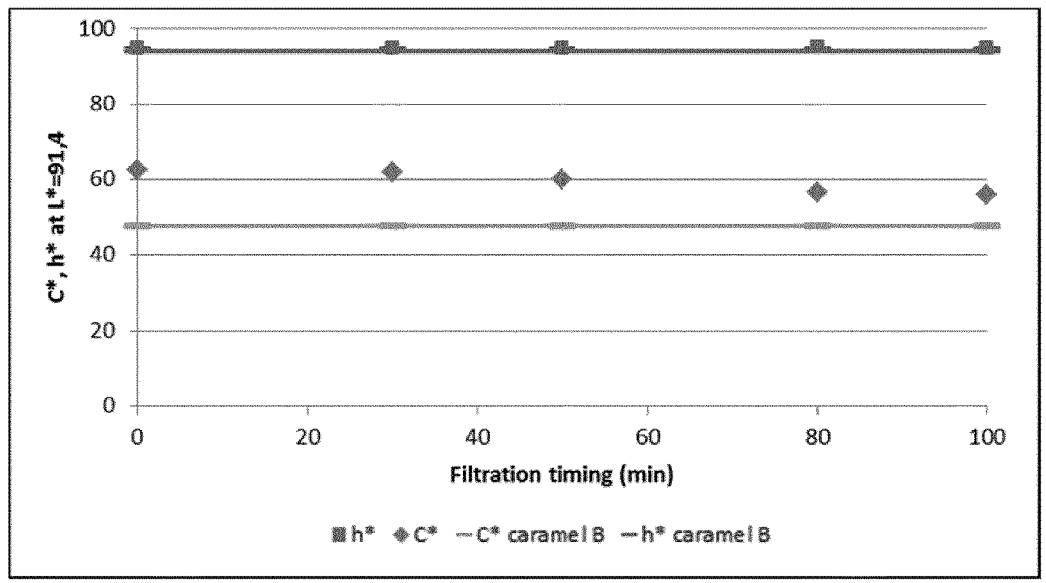
FIG. 3 shows the evolution of permeate shade (h*) and chroma (C*) at L*=91.4 in distilled water during the ultra-filtration of the caramel B at pilot scale on 10 kD. C* and h* values associated to the initial caramel E150b are also represented.
Figure 4:
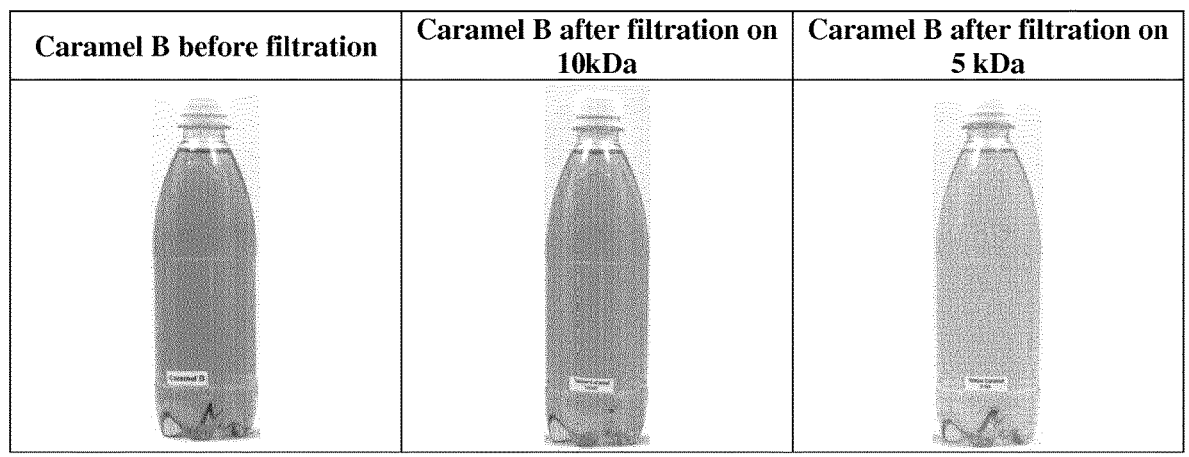
FIG. 4 shows soft drinks colored with Caramel B before filtration, Caramel B after filtration on 10 kDa and Caramel B after filtration on 5 kDa. Significant increased brightness was found for both of the filtrated (permeate) compositions.

FIG. 3 shows the evolution of permeate shade ($h^*$) and chroma ($C^*$) during the filtration of the caramel B at pilot scale.

Ultrafiltration does not modify the shade of the caramel B; the hue remains the same whatever the filtration time considered.

According to the $C^*$ values, the ultrafiltration allows a large increase of the brightness, such as observed at lab scale. Although the $C^*$ value decreases during the ultrafiltration, it remains higher than the $C^*$ of the starting product.

The ultrafiltration process was stopped after 100 minutes, and about 550 L of permeate was recovered.

The permeate flow rate slightly decreased over the process, from 347 to 310 L/h. 500 L of permeate were concentrated (by evaporation of water under reduced pressure) until reaching a ° Brix of 78.2 and a corresponding volume of 18 Kg. The retentate, considered as by-product, is concentrated as well.

Characteristics of the products obtained are displayed below.

Color Characteristics of the Bright Yellow Caramel Obtained and Retentate

TABLE 3

Colorimetric characteristics of the bright yellow caramel, of the retentate and of the caramel B.

|  | L | a | b | $C^*$ | $h^*$ |
|---|---|---|---|---|---|
| Bright yellow caramel | 70.01 | 28.40 | 104.78 | 108.56 | 74.84 |
| Retentate | 70.02 | 21.71 | 87.32 | 89.98 | 76.04 |
| Caramel B | 70.09 | 15.00 | 90.49 | 91.73 | 80.59 |

The bright yellow caramel presents a tint ($h^*$) slightly less yellow than the caramel B, but is much brighter.

Based on the $h^*$ values, the bright yellow caramel is slightly less yellow than the raw material (because the hue is lower)—but due to the high Chroma (then a product is much brighter), the product visually appears yellow.

The retentate presents the same hue as the bright yellow caramel, the same brightness as the caramel B. Globally, the retentate is quite close to the caramel B in term of color.

TABLE 4

Color strength and °Brix of the bright yellow caramel, of the retentate and of the caramel B.

|  | Color strength at 430 nm (EBC) | °brix | Weight (Kg) |
|---|---|---|---|
| Bright yellow caramel | 40 600 ± 300 | 78.2 | 18 |
| Retentate | 1 08 300 ± 500 | 67.4 | 12 |
| Caramel B | 80 259 ± 366 | 76.7 | 40 |

At pilot scale, the ultrafiltration followed by concentration allows to get a bright yellow caramel, presenting a color strength equal to 40 600 EBC (measured at 430 nm) at 78.2° brix.

The retentate obtained presenting a shade close to the initial caramel B and a high color strength, it could be valorized as caramel B.

Example 3. Evolution of the Brightness of the Caramel B after Ultrafiltration and Concentration: Evaluation in Beverage Application The caramel B used as starting product for the preparation of the bright yellow caramel in Example 2 and the bright yellow caramel as prepared in Example 2 were applied in a model beverage medium for color comparison.

Preparation of Model Beverage Medium

The model beverage medium was prepared according to the following recipe:

| Saccharose | 43% |
|---|---|
| Potassium Sorbate | 0.09% |
| Sodium Benzoate | 0.07% |
| Citric acid anhydrous | 0.6% |
| Demineralized water | 56.24% |

A soft drink concentrate around 40° Brix was obtained and further diluted with deionized water until 11° Brix. pH was finally adjusted to 3.0±0.2 with citric acid.

Procedure and Color Evaluation

The colors were added directly into the model beverage medium at following dosages:

Bright yellow caramel: 1 g/L and 4.4 g/L
Caramel B: 0.35 g/L and 1.4 g/L

The dosages have been selected in order to have beverages presenting similar color intensities, which allow the comparison of the brightness and the hue of the colorants.

After preparation of the colored beverages, the liquids were poured into PET bottles and colorimetric parameters evaluated using Spectraflash 650 (Datacolor) in transmission mode under D65/10 degree illuminant.

Results and Discussion

TABLE 5

Spectrocolorimetric parameters of the model beverage medium colored with the bright yellow caramel and caramel B at low and high dosage.

|  | L | $C^*$ | $h^*$ |
|---|---|---|---|
| Low dosage | | | |
| Bright yellow caramel | 75.62 | 83.51 | 84.1 |
| Caramel B | 74.27 | 73.96 | 83.33 |
| High dosage | | | |
| Bright yellow caramel | 48.4 | 91.04 | 63.44 |
| Caramel B | 47.5 | 88.31 | 64.01 |

Table 5 presents the spectrocolorimetric characteristics of the beverage colored with the bright yellow caramel or with caramel B at low and high dosage.

At low dosage, the two caramel present close tint, but the bright yellow caramel is significantly brighter.

At high dosage, the tints of the two products are very close. The bright yellow caramel is brighter than the caramel B, but the difference is less obvious than observed at low dosage.

Example 4. Comparison of the Shades of the Bright Yellow Caramel with Other Bright Yellow Colorants in Beverage Application The bright yellow caramel as prepared in Example 2 was applied in a model beverage medium for comparison of the shade with six food colorants presenting bright yellow shades and being used in this application.

Food colors applied in beverage medium are listed below:
Tartrazine, 95% artificial dye
Carthamus extract
Natural carotenes extract, emulsion
Lutein extract, emulsion
Turmeric extract
Gardenia yellow extract Preparation of Model Beverage Medium The model beverage medium was prepared according to the following recipe:

| | |
|---|---|
| Saccharose | 43% |
| Potassium Sorbate | 0.09% |
| Sodium Benzoate | 0.07% |
| Citric acid anhydrous | 0.6% |
| Demineralized water | 56.24% |

A soft drink concentrate around 40° Brix was obtained and further diluted with demineralized water until 11° Brix. pH was finally adjusted to 3.0±0.2 with citric acid.

Procedure and Color Evaluation

The colors were added directly into the model beverage medium at following dosages:
Bright yellow caramel: 0.5 g/L
Tartrazine: 0.006 g/L
Carthamus extract: 0.8 g/L
Natural carotenes extract, emulsion: 0.02 g/L
Lutein extract, emulsion: 0.08 g/L
Turmeric extract: 0.03 g/L
Gardenia yellow extract: 0.02 g/L The dosages have been determined in order to have beverages presenting close color intensities, which allows for comparison the brightness and hue of the different colorants.

After preparation of the colored beverages, the liquids were poured into PET bottles and colorimetric parameters evaluated using Spectraflash 650 (Datacolor) in transmission mode under D65/10 degree illuminant.

Results and Discussions

TABLE 6

Spectrocolorimetric characteristics of the model beverage medium colored with the different yellow food colorants.

| | L | C* | h* | DE 2000 |
|---|---|---|---|---|
| Bright yellow caramel | 85.28 | 61.35 | 80.87 | — |
| Tartrazine | 91.61 | 93.64 | 98.95 | 16.14 |
| Carthamus | 90.13 | 80.23 | 99.29 | 14.62 |
| Natural carotenes extract, emulsion | 85.33 | 84.58 | 87.20 | 7.27 |
| Lutein extract, emulsion | 87.18 | 83.57 | 88.10 | 7.68 |
| Turmeric extract | 92.01 | 83.57 | 101.26 | 16.53 |
| Gardenia yellow extract | 89.68 | 84.31 | 94.81 | 12.14 |

Table 6 presents the spectrocolorimetric characteristics of the different bottles and the DE2000 values, corresponding to the total color variation of each color tested, by comparison with the bright yellow caramel.

Example 5. Stability of the Bright Yellow Caramel in Beverage Application

Two bright yellow burnt sugars and one bright yellow caramel are evaluated in a model beverage medium for determining cold, heat and light stabilities against two standard references (caramel B and carthamus) having similar shades and being used in this application. All samples have been tested at low and high dosage.

Preparation of Model Beverage Medium

The model beverage medium was prepared according to the following recipe:

| | |
|---|---|
| Saccharose | 43% |
| Potassium Sorbate | 0.09% |
| Sodium Benzoate | 0.07% |
| Citric acid anhydrous | 0.6% |
| water | 56.24% |

A soft drink concentrate around 40° Brix was obtained and further diluted with demineralized water until 11° Brix. pH was finally adjusted to 3.0±0.2 with citric acid and 250 mg/L of ascorbic acid is added.

Procedure and Color Evaluation

The colors were added directly into the model beverage medium at following dosages:
Bright yellow burnt sugar prototype 1 at 0.5% and 1%
Bright yellow burnt sugar prototype 2 at 0.1% and 0.2%
Bright yellow caramel at 0.025% and 0.05%
Standard caramel B at 0.01% and 0.02%
Standard carthamus at 0.005% and 0.01%

The prototype 1 contains 10775 EBC (measured at 430 nm) at 79.7° brix.

The prototype 2 contains 8398 EBC (measured at 430 nm) at 71.4° brix

The bright yellow caramel contains 40600 EBC at 78.2° brix.

After preparation of the colored beverages, the liquids were poured into PET bottles and then stored:
For light stability: at daylight exposure, room temperature
For heat stability: in a binder incubator set up at 40° C., 65% RH
For reference storage: in a cold room at 4° C. in the dark Colorimetric follow-up was done every week during one month. Measurements were performed directly on the PET bottles using Spectraflash 650 (Datacolor) in transmission mode under D65/10 degree illuminant.

Results and Discussion

TABLE 7

Shades of the model beverage medium colored with the bright yellow burnt sugars, the bright yellow caramel and the two references at low dosage and at day 0.

| | L | C* | h* | DE 2000 |
|---|---|---|---|---|
| Bright yellow burnt sugar prototype 1 | 90.29 | 45.23 | 100.63 | — |
| Bright yellow burnt sugar prototype 2 | 90.03 | 40.08 | 99.17 | 1.92 |
| Bright yellow caramel | 88.72 | 39.48 | 96.40 | 3.10 |
| Standard caramel B | 88.21 | 33.24 | 94.88 | 5.32 |
| Standard carthamus | 92.85 | 39.62 | 108.42 | 4.58 |

TABLE 8

Shades of the model beverage medium colored with the bright yellow burnt sugars, the bright yellow caramel and the two references at high dosage and at day 0.

|  | L | C* | h* | DE 2000 |
|---|---|---|---|---|
| Bright yellow burnt sugar prototype 1 | 86.16 | 70.06 | 93.75 | — |
| Bright yellow burnt sugar prototype 2 | 85.22 | 64.40 | 92.14 | 1.91 |
| Bright yellow caramel | 83.31 | 63.22 | 90.04 | 3.67 |
| Standard caramel B | 82.79 | 54.03 | 89.40 | 5.61 |
| Standard carthamus | 91.45 | 59.63 | 104.77 | 8.50 |

Tables 7 and 8 summarize the shades of the model beverage medium colored with the different food colors, at low and high dosage, respectively.

Beverages colored with bright yellow burnt sugar prototypes are brighter and more yellow than the ones colored with the bright yellow caramel, which are even brighter and even more yellow than the beverages colored with the standard caramel B.

The beverage colored with carthamus presents a different shade: brighter and more yellow than all the other samples.

Figure 5:
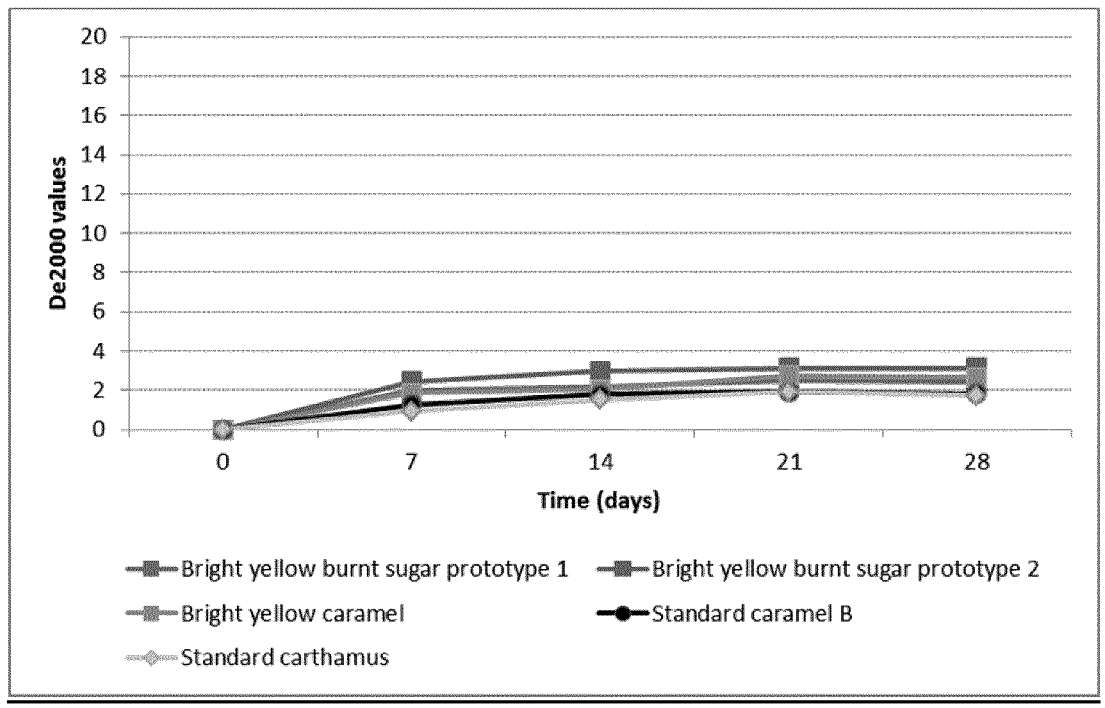
FIG. 5 shows the evolution of DE 2000 during 1-month storage of a model beverage medium colored with the bright caramel, at low dosage, in cold room.

FIG. 5 shows the evolution of DE 2000 during the 1-month storage of colored model beverage medium, at low dosage, in cold room.

Figure 6:
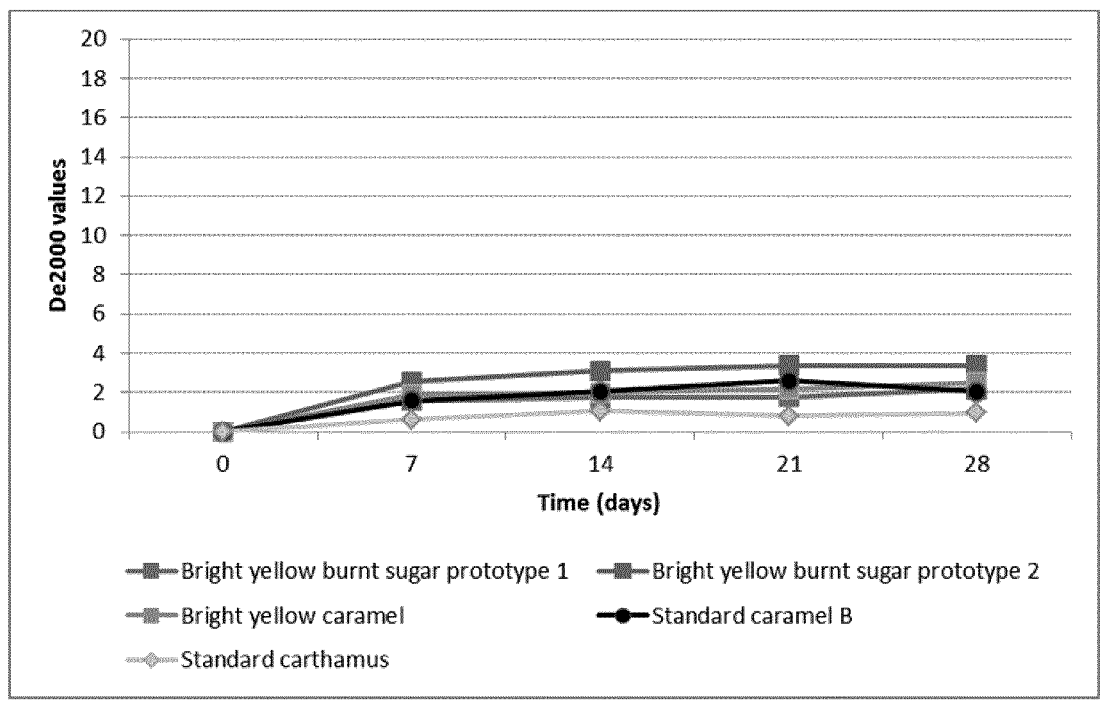
FIG. 6 depicts the evolution of DE 2000 during 1-month storage of a model beverage medium colored with the bright caramel, at high dosage, in cold room.

FIG. 6 shows the evolution of DE 2000 during the 1-month storage of colored model beverage medium, at high dosage, in cold room.

Beverages colored with bright yellow burnt sugar prototypes, bright yellow caramel and standard caramel B present similar stabilities under cold storage. Evolution of coloration is very slight whatever the color reference and the dosage applied. Coloration of beverages colored with carthamus remains visually unchanged over the storage.

Figure 7:
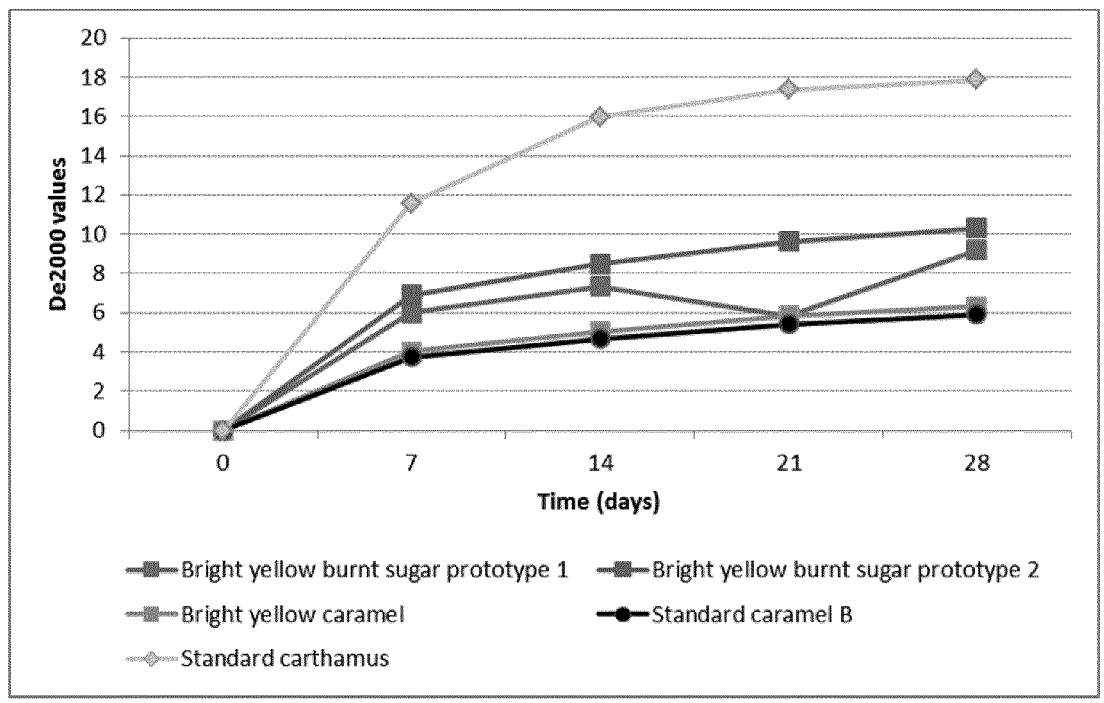
FIG. 7 shows the evolution of DE 2000 during 1-month storage of a model beverage medium colored with the bright caramel, at low dosage, under light exposure.

FIG. 7 shows the evolution of DE 2000 during the 1-month storage of colored model beverage medium, at low dosage, under light exposure.

Figure 8:
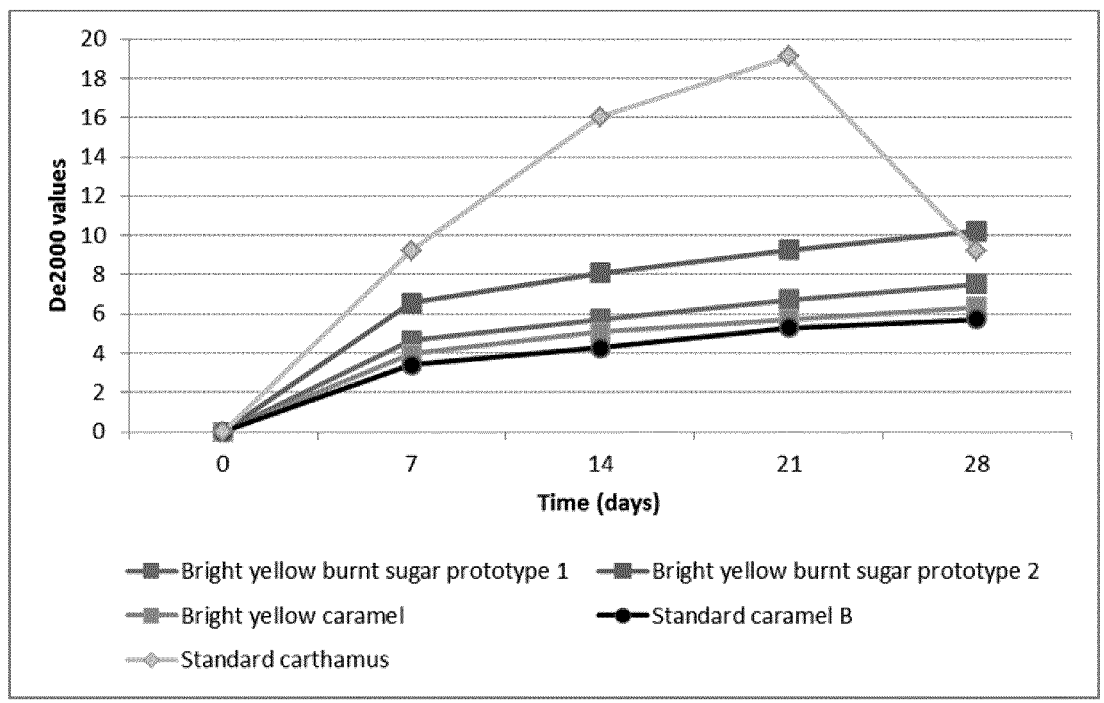
FIG. 8 shows the evolution of DE 2000 during 1-month storage of a model beverage medium colored with the bright caramel, at high dosage, under light exposure.

FIG. 8 shows the evolution of DE 2000 during the 1-month storage of colored model beverage medium, at high dosage, under light exposure.

Beverages colored with bright yellow burnt sugar prototypes present lower stabilities than the ones colored with bright yellow caramel or standard caramel B after 1-month light exposure, and whatever the dosage applied. Color stability to light of the carthamus is far worse than all the other colors tested.

Figure 9:
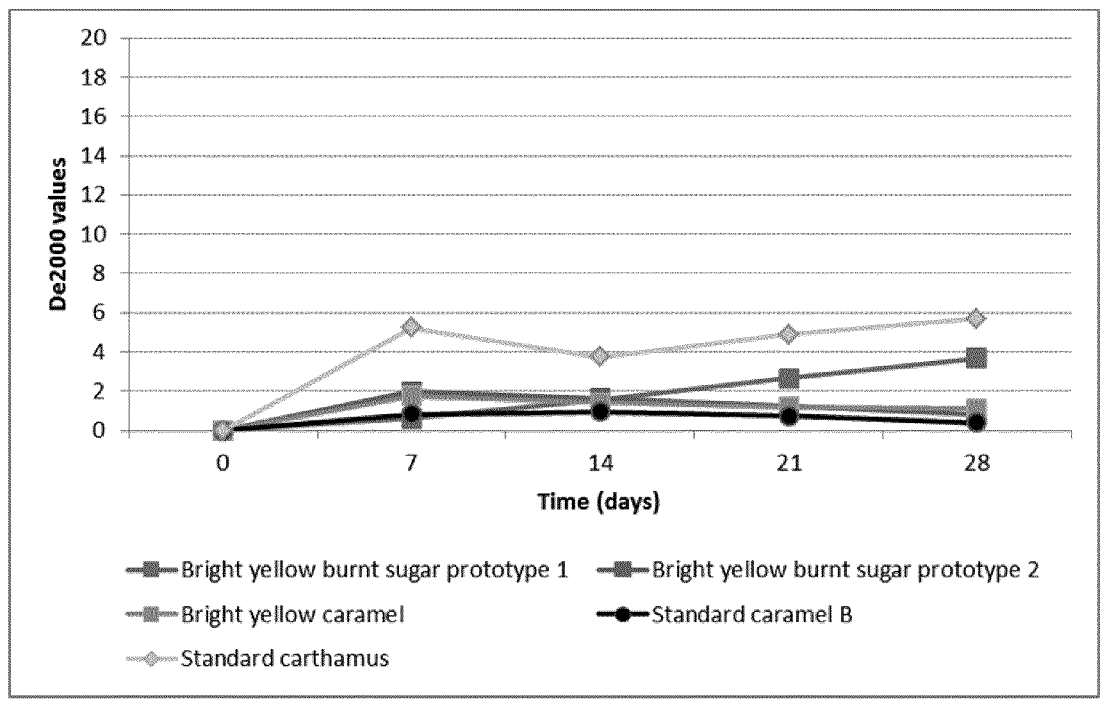
FIG. 9 depicts the evolution of DE 2000 during 1-month storage of a model beverage medium colored with the bright caramel, at low dosage, under heat exposure.

FIG. 9 shows the evolution of DE 2000 during the 1-month storage of colored model beverage medium, at low dosage, under heat exposure.

Figure 10:
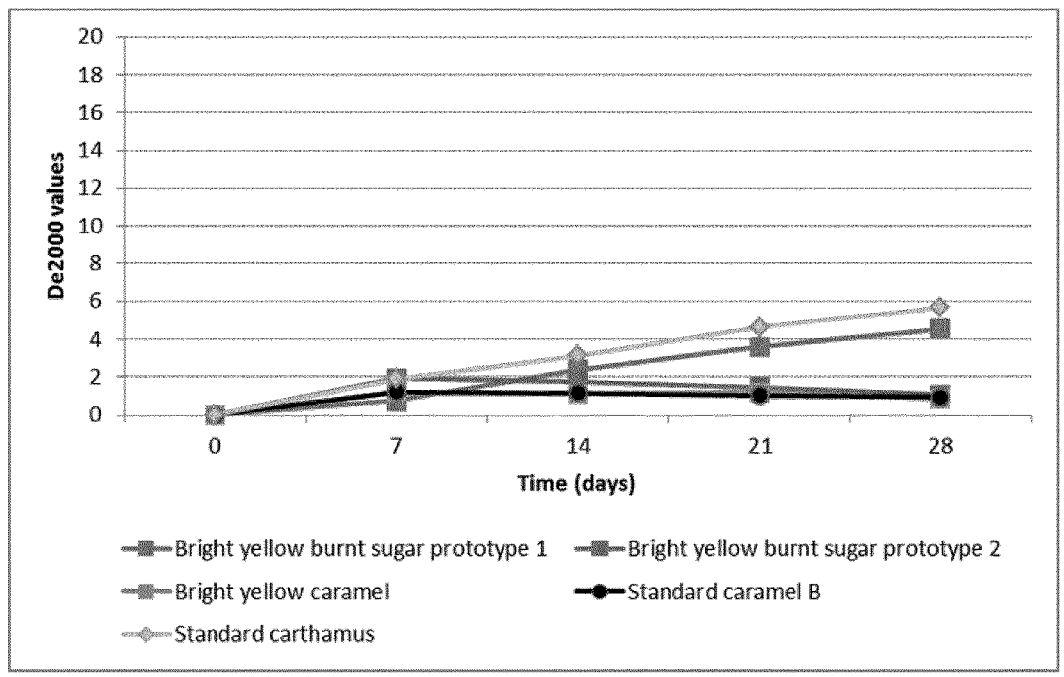
FIG. 10 depicts the evolution of DE 2000 during 1-month storage of a model beverage medium colored with the bright caramel, at high dosage, under heat exposure.

FIG. 10 shows the evolution of DE 2000 during the 1-month storage of colored model beverage medium, at high dosage, under heat exposure.

Beverages colored with bright yellow caramel, standard caramel B and burnt sugar prototype 2 present similar and acceptable stabilities after 1-month light exposure, and whatever the dosage applied. The beverage colored with bright yellow burnt sugar prototype 1 presents a worse stability to heat and becomes browner during the storage. Color stability of the carthamus to heat is worse than all the other colors tested.

Example 6. Blend of Bright Yellow Caramel and Anthocyanins as Color: Shade and Stability in Alcoholic Drink Application A bright yellow caramel (product corresponding to the bright caramel prepared in Example 2) blended with anthocyanins is applied in alcoholic drink application. The colored beverage is compared in terms of shade and stability to a commercialized alcoholic drink colored with carminic acid and caramel.

Preparation of Model Beverage Medium

A concentrated base for the alcoholic drink preparation is blended with $SO_2$ (41 ppm) and diluted with tap water. The colors are added, the liquid poured in transparent PET bottles and the product is carbonated (3.2 g/L $CO_2$).

Two colors were used:
  Anthocyanins from red radish (10 CU/Kg), applied at 0.2 g/L
  Bright yellow caramel (40,600 EBC), applied at 1 g/L Procedure and Color Evaluation After preparation of beverage, the PET bottles were stored in the dark at 4° C. or 32° C.

Colorimetric follow-up was done after 1 month, 2 months, 4 months and 6 month-storage. The samples were measured in 0.5 L PET bottles using Spectraflash 650 (Datacolor) in transmission mode under D65/10 degree illuminant and visually evaluated in bottles.

Results and Discussion

TABLE 9

Evolution of the global color difference De2000 for the target and the alcoholic drink colored with bright yellow caramel and anthocyanins stored at two different temperatures for 6 months.

|  | Commercialized alcoholic drink | | Alcoholic drink colored with bright yellow caramel and anthocyanins | |
|---|---|---|---|---|
|  | 4° C. | 32° C. | 4° C. | 32° C. |
| DE2000 after 1-month storage | — | 0.14 | — | 0.62 |
| DE2000 after 2-months storage | 0.50 | 0.63 | 0.80 | 0.94 |
| DE2000 after 4-months storage | 0.52 | 0.14 | 0.81 | 1.05 |
| DE2000 after 6-months storage | 1.86 | 2.39 | 1.88 | 2.51 |

Figure 11:
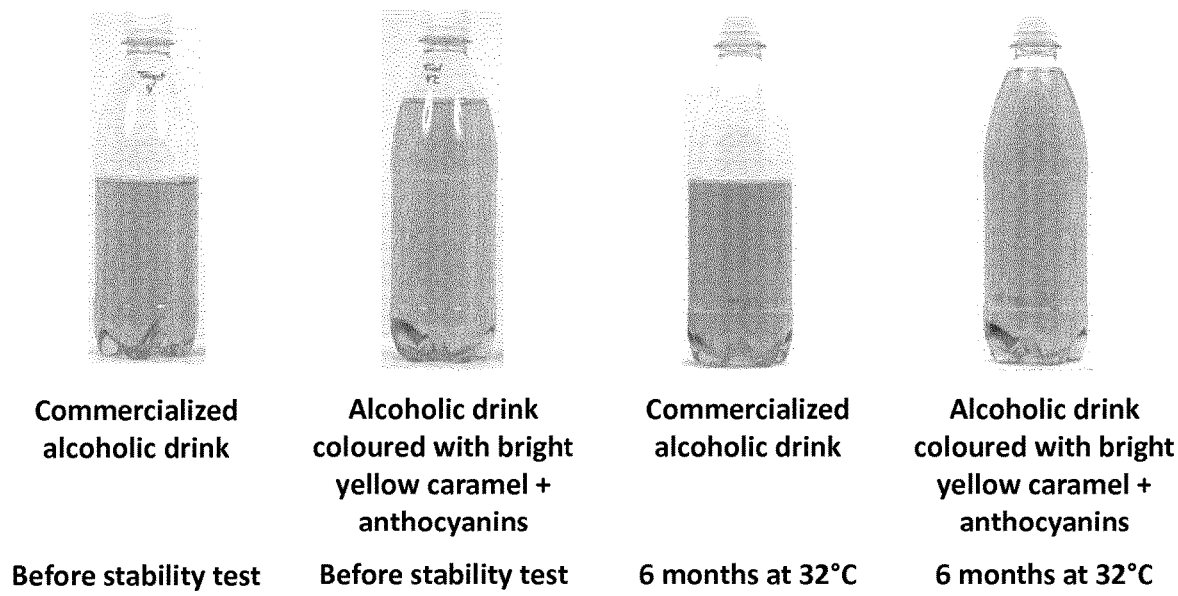
FIG. 11 shows commercialized alcoholic drink and alcoholic drink colored with bright yellow caramel and anthocyanins before stability test and after 6-months storage at 32° C.

FIG. 11 shows the bottles of the commercialized alcoholic drink and the alcoholic drink colored with bright yellow caramel and anthocyanins before stability test and after 6-months stability at 32° C.

Table 9 summarizes the global color evolution for the commercialized alcoholic drink and the alcoholic drink colored with bright yellow caramel and anthocyanins stored at 4° C. or 32° C. for 6 months.

The alcoholic drink colored with bright yellow caramel and anthocyanins is very close to the commercialized alcoholic drink in term of shade and color evolution.

The alcoholic drink colored with bright yellow caramel presents a good stability for 2 months. After 6 months, both samples show an equivalent loss of color intensity.

No sedimendation or flocculation has been noticed after 6 months storage.

Example 7. Shades of the Yellow Caramel in Bakery Applications

A bright yellow caramel (the bright caramel used for the tests in bakery corresponds to the one prepared in Example 1) was applied in macarons and in muffins for evaluation of the shade and comparison with other yellow natural colors generally used in these applications (Carthamus extract, caramel A and orange carrot juice concentrate).

Preparation of Model Food Medium (Macarons)

The macarons were prepared with the ingredients listed below and according to the following procedure.

| | |
|---|---|
| Almond Flour | 60 g |
| Icing sugar | 110 g |
| Pasteurized egg white | 50 g |
| Granulated sugar | 12.5 g |
| Natural Color | |

Procedure for Macarons Preparation

Dry parts were mixed at high speed in food processor for 2 minutes.
Wet parts were mixed at high speed with a hand mixer until stiff.
Dry part was turned carefully into wet part.
The dough was dosed at a baking tray at desired size and let rest for 30 minutes before baking.
It was baked without hot air at 140° C.-160° C. for 16-20 minutes.
It was cooled at baking tray before further handling.

Preparation of Model Food Medium (Muffins)

The muffins were prepared with the ingredients listed below and according to the following procedure.

| | |
|---|---|
| Water | 75 g |
| Sunflower Oil | 60 g |
| Cake mix | 165 g |
| Natural Color | |

The cake mix is composed of wheat flour, sugar, whole egg powder, starch, dextrose, skim milk powder, raising agents E 450 & E 500, vegetable oil, flavor (vanilla), salt, vegetable emulsifier E 471, glycose syrup and milk proteins.

Procedure for Muffins Preparation:

Water, sunflower oil and the color are mixed together.
The cake mix is added and the preparation mixed at high speed with hand mixer for 1 minute.
The dough is poured into a greased form (L:23 cm×W:10 cm×H:6 cm)
The cakes are baked at low row in hot air oven at 170° C. for 25 minutes.

Procedure and Color Evaluation

The colors were added directly into the macarons preparation at following dosages:
Bright yellow caramel (10,000 EBC) at 3.0%
Carthamus extract (9 Color Units/Kg) at 2.5%
Caramel A (26,000 EBC) at 1.0%
The colors were added directly into the muffins preparation at following dosages:
Bright yellow caramel (10.000 EBC) at 2.0%
Orange carrot juice concentrate (0.12% beta-carotene) at 1.0%
Carthamus extract (9 Color Units/Kg) at 0.5%
Caramel A (26.000 EBC) at 0.74%
Color evaluation consists of a visual evaluation of the shade and brightness.

Results and Discussions

Figure 12:
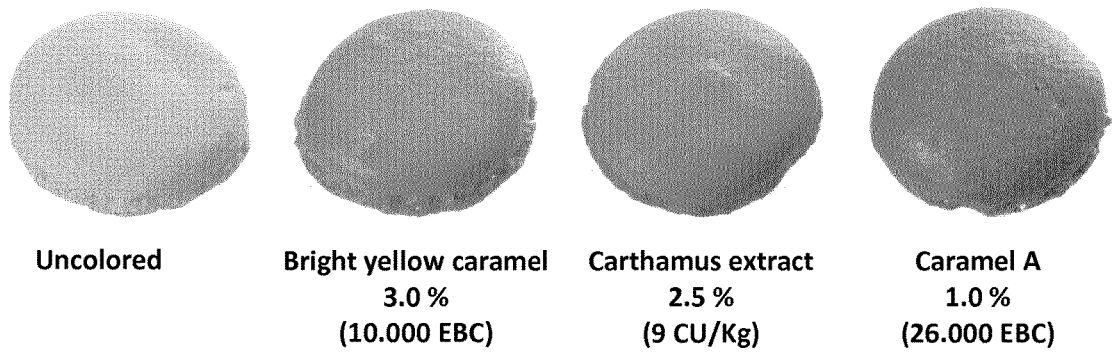
FIG. 12 shows macarons uncolored or colored with bright yellow caramel, carthamus extract or caramel A (from left to right).
Figure 13:
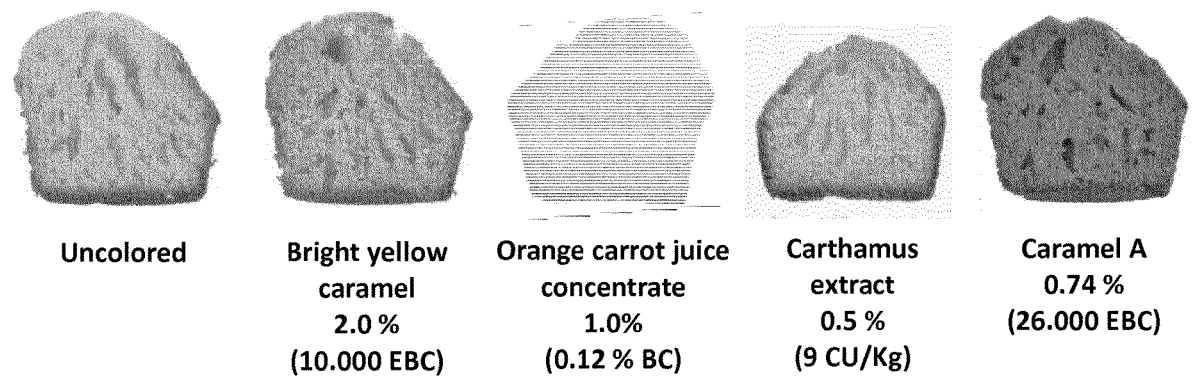
FIG. 13 depicts muffins uncolored or colored with bright yellow caramel, orange carrot juice concentrate, carthamus extract or caramel A (from left to right).

FIG. 12 shows the macarons uncolored or colored with the different food colors tested.
In macarons, the bright yellow caramel provides a bright and light golden brown color. This shade is more orange than the one given by carthamus extract and less brown than the color obtained with caramel A.
FIG. 13 shows the muffins uncolored or colored with the different food colors tested.

In muffins, the bright yellow caramel provides a light golden brown color which may be described as very "natural" light brown look. This shade is less orange than cake colored with orange carrot juice and less brown than muffins colored with caramel A.

Example 8. Shades of the Yellow Caramel in Ready Bouillon

A bright yellow caramel (the bright caramel tested in ready bouillon corresponds to a product prepared such as described in Example 1) was applied in ready bouillon for evaluation of the shade and comparison with other yellow natural colors generally used in this application (Carthamus extract and caramel A).

Preparation of Model Food Medium

The bouillon cubes are prepared with the ingredients listed below and according to the following procedure:

| | |
|---|---|
| Salt | 330 g |
| Water | 20 g |
| Basemix | 500 g |
| Palm oil stearin | 150 g |

The basemix is composed of maltodextrin (40%), salt (37.6%), palm oil stearin (20%), citric acid (1.6%), water (0.4%), and natural color.

Procedure for Bouillon Cubes Preparation:

Salt, water and color are mixed together in a mortar.
The colored salt is mixed with the basemix in a kitchen aid.
Palm oil stearin is melted in microwave oven at 50° C. and added slowly to the colored basemix while running the kitchen aid.
The mass is stirred until a homogenous texture is achieved.
A 10 g bouillon cube is diluted in 500 mL of hot water to obtain the ready bouillon.

Procedure and Color Evaluation

The colors were added directly into the bouillon cube preparation at following dosages:
Bright yellow caramel (10,000 EBC) at 5.0% or 10%
Carthamus extract (9 Color Units/Kg) at 2.5%
Caramel A (26,000 EBC) at 2.5%
Color evaluation consists of a visual evaluation of the shade and brightness.

Results and Discussion

Figure 14:
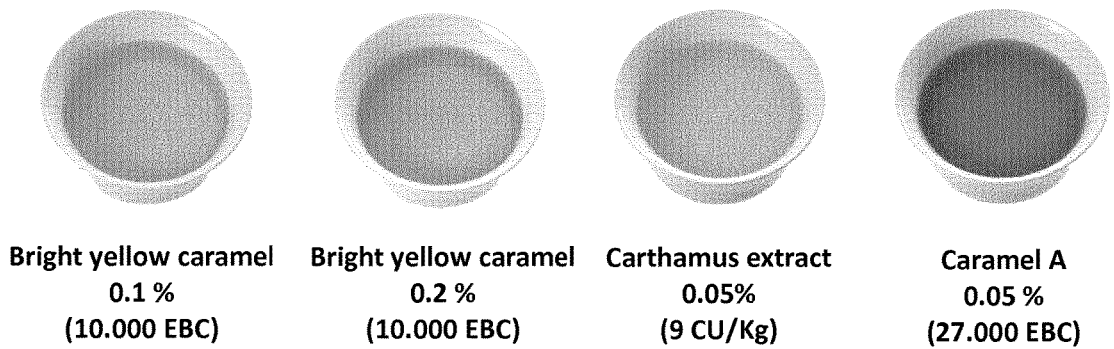
FIG. 14 shows ready bouillons colored with two dosages of bright yellow caramel, carthamus extract or caramel A (from left to right).

FIG. 14 shows the ready bouillons colored with the different food colors tested.
In ready bouillon, the bright yellow caramel provides a bright and golden brown color. This shade is more orange than the one given by carthamus extract and less brown than the color obtained with caramel A.

REFERENCES

1. U.S. Pat. No. 3,249,444
2. U.S. Pat. No. 4,416,700
3. U.S. Pat. No. 5,114,492
4. US 2011/0244102

The invention claimed is:
1. A method of coloring an edible product, comprising:
adding to an edible product an edible; water-soluble caramel colorant, wherein the edible water-soluble caramel colorant composition comprises solid particles of one or more caramel color products of a Class selected from one or more of Class I (E150a), Class II (E150b), Class III (E150c), and Class IV (E150d), wherein the edible water caramel colorant composition is added to the edible product in an amount of from 0.001% (w/w) to 3% (w/w) of the edible product, wherein the edible water-soluble caramel colorant composition is obtained by a process:
- subjecting a solution of the one or more caramel color product to an ultrafiltration using a semi-permeable membrane, wherein the ultrafiltration is performed with a transmembrane pressure from 0.5 to 2.5 bar and with a temperature range from 10 to 40 degrees Celsius;
- collecting a permeate, wherein the permeate comprises the solid particles having a molecular weight (MW) below 12500 Da; and
- concentrating the permeate to at least 50-degree Brix, wherein the caramel colorant composition in the $L^*C^*h^*$ color space, measured at an $L^*$ value of 70.0 in deionized water in a 1 cm-length quartz cell using spectrophotometer Data color 650 in transmission mode under D65 illuminant 10-degree observer with wavelength range 360 nm to 700 nm and reporting at 10 nm intervals with transmission sampling aperture size of 22 mm, has a $C^*$ value from 100.0 to 130 and an $h^*$ value from 65.0 to 77.0.

2. The method of claim 1, wherein the semi-permeable membrane has a MW cut-off of from 10500 Da to 950 Da.

3. The method of claim 1, wherein the semi-permeable membrane has a MW cut-off of from 10500 Da to 4500 Da.

4. The method of claim 1, further comprising drying the permeate.

5. The method of claim 1, wherein the caramel colorant composition has a degree Brix of at least 50.

6. The method of claim 1, wherein the caramel color product(s) are of a Class selected from one or more of Class I (E150a) and Class II (E150b).

* * * * *